US 9,584,377 B2

(12) United States Patent
Prasad et al.

(10) Patent No.: US 9,584,377 B2
(45) Date of Patent: Feb. 28, 2017

(54) TRANSPARENT ORCHESTRATION AND MANAGEMENT OF COMPOSITE NETWORK FUNCTIONS

(71) Applicant: Oracle International Corporation, Redwood Shores, CA (US)

(72) Inventors: Renuka Prasad, Westford, MA (US); James Lawrence Scali, Hollis, NH (US); Gary M. Lorkiewicz, Sutton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 210 days.

(21) Appl. No.: 14/550,271

(22) Filed: Nov. 21, 2014

(65) Prior Publication Data

US 2016/0149771 A1 May 26, 2016

(51) Int. Cl.
*H04L 12/24* (2006.01)
*H04L 29/08* (2006.01)

(52) U.S. Cl.
CPC ...... *H04L 41/5054* (2013.01); *H04L 41/0893* (2013.01); *H04L 41/12* (2013.01); *H04L 41/5025* (2013.01); *H04L 67/10* (2013.01); *H04L 67/1031* (2013.01); *H04L 67/1097* (2013.01); *H04L 41/5096* (2013.01)

(58) Field of Classification Search
CPC ............................. H04L 67/10; H04L 41/5054
See application file for complete search history.

(56) References Cited

U.S. PATENT DOCUMENTS

| 7,321,566 B2 | 1/2008 | Fu |
| 7,349,957 B1 | 3/2008 | Matthews et al. |
| 2011/0134277 A1* | 6/2011 | Iuno ............ H04N 1/32128 348/231.2 |
| 2016/0062746 A1* | 3/2016 | Chiosi ............ G06F 8/35 717/104 |

OTHER PUBLICATIONS

Oracle Data Sheet; "Oracle Communications Application Orchestrator"; Copyright 2014; last downloaded Nov. 21, 2014.

* cited by examiner

*Primary Examiner* — Abdullahi E Salad
(74) *Attorney, Agent, or Firm* — Miles & Stockbridge P.C.

(57) ABSTRACT

A system that manages a network of network elements receives a network topology of the network elements, where the network elements include a first type of network elements and a second type of network elements. The system creates a first network function ("NF") group that corresponds to the first type of network elements, and creates a second NF group that corresponds to the second type of network elements. The system implements a functionality of the first NF group on a physical network function component. The system implements a functionality of the second NF group as a virtual machine ("VM"). The system then forms a composite network function ("CNF") using the first NF group and the second NF group. The CNF can be centrally managed.

20 Claims, 12 Drawing Sheets

TRANSPARENT ORCHESTRATION AND MANAGEMENT OF COMPOSITE NETWORK FUNCTIONS

FIELD

One embodiment is directed generally to a communications network, and in particular to the management of network functions on a communications network.

BACKGROUND INFORMATION

In computer/communications networks, network management refers to the activities, methods, procedures and tools that pertain to the operation, administration, maintenance and provisioning ("OAMP") of networked systems. Operation deals with keeping the network (and the services that the network provides) up and running smoothly. It includes monitoring the network to spot problems as soon as possible, ideally before users are affected.

Administration deals with keeping track of resources in the network and how they are assigned. It includes all the "housekeeping" that is necessary to keep the network under control. Maintenance is concerned with performing repairs and upgrades. For example, when equipment must be replaced, when a router needs a patch for an operating system image, when a new switch is added to a network. Maintenance also involves corrective and preventive measures to make the managed network run "better", such as adjusting device configuration parameters. Provisioning is concerned with configuring resources in the network to support a given service. For example, this might include setting up the network so that a new customer can receive voice service, data services, real time communications, etc.

Communications service providers, in general, manage network functions discretely. Managing individual pieces of network functions increases the operational burden. To alleviate this, service providers have resorted mainly to centralized management of discrete heterogeneous network functions from many vendors. Network management is essential to command and control practices and is generally carried out of a network operations center. Although centralized management alleviates the problem to a small degree, this method of network function management has several operational inefficiencies, as it attempts to concentrate network function intelligence in a single location, which creates knowledge mismatch and additional overhead on other ecosystem functions/products.

SUMMARY

One embodiment is a system that manages a network of network elements. The system receives a network topology of the network elements, where the network elements include a first type of network elements and a second type of network elements. The system creates a first network function ("NF") group that corresponds to the first type of network elements, and creates a second NF group that corresponds to the second type of network elements. The system implements a functionality of the first NF group on a physical network function component. The system implements a functionality of the second NF group as a virtual machine ("VM"). The system then forms a composite network function ("CNF") using the first NF group and the second NF group. The CNF can be centrally managed.

DETAILED DESCRIPTION

One embodiment is a system that provides decentralized orchestration and management of network functions/elements with topology hiding (i.e., network function transparency) to improve operational efficiencies. The decentralized architecture in accordance to embodiments allows intelligence to reside closer to the network functions for efficient control and intimacy. By leveraging deeper intelligence of network functions and policies, expansion and contraction of network functions can be accomplished relatively seamlessly. Further, by monitoring network functions closely, better fault correlation and isolation can be performed to provide self-healing capability closer to the network functions. With intimate network function knowledge, decentralized control in accordance to embodiments allows for better application level reconfiguration, such as traffic rebalancing, rerouting, etc., based on dynamic network conditions.

Embodiments manage the life cycle of a group of network elements, or the individual sub-components that comprise a single network element. Embodiments create one or more ("NF") groups that correspond to specific types of network elements or sub-components. Embodiments allow the composition of complex NF processes and presents it as a complete solution via a composite network function ("CNF"). The CNF can be composed of virtual elements, physical elements, or a mixture of both, to support the management of a hybrid NF solution.

Figure 1:
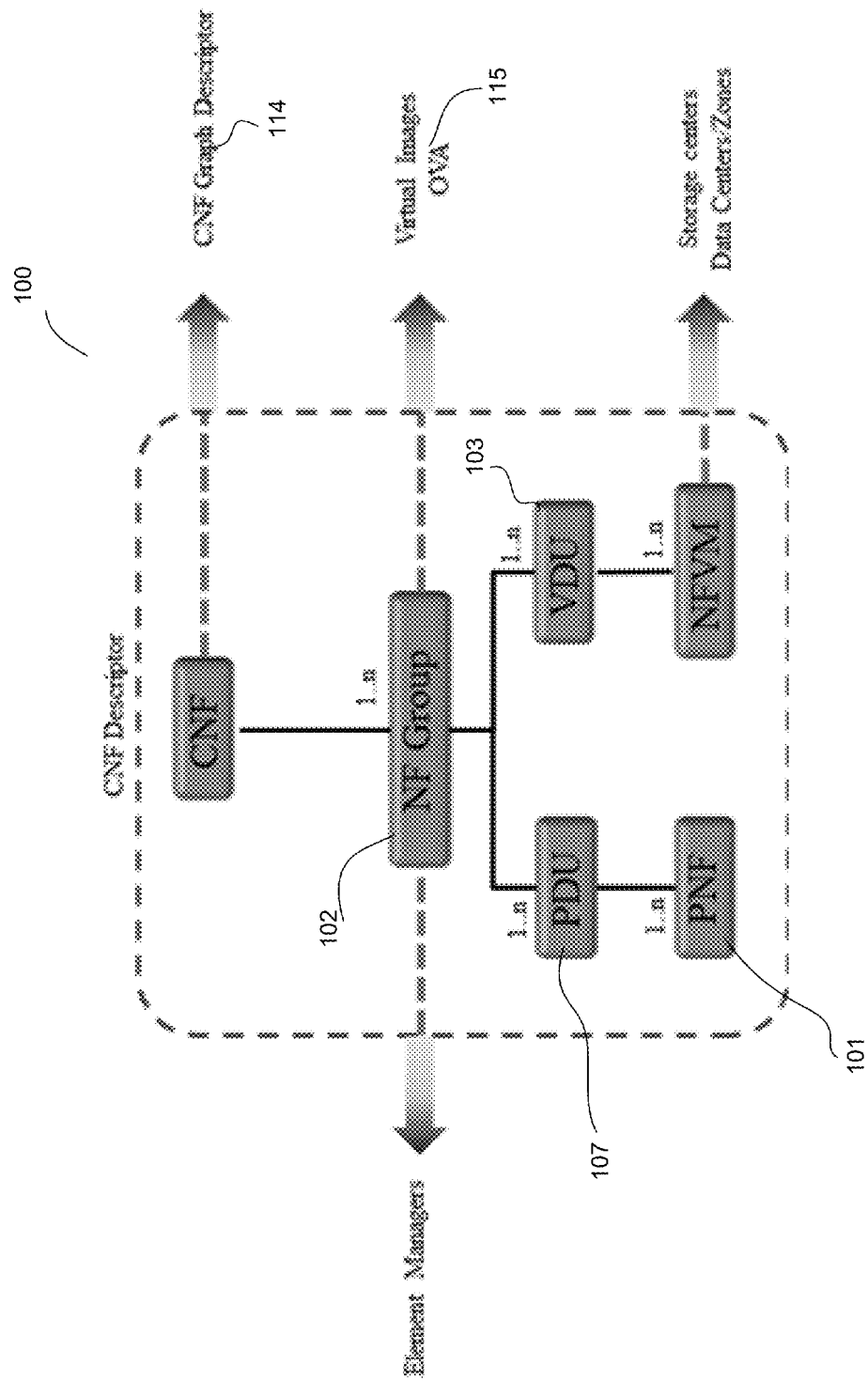
FIG. 1 illustrates the components that collaborate in order to provide the required management and deployment support to allow arrangements of different types of related network functions/elements that form and describe a composite network function in accordance to one embodiment.

FIG. 1 illustrates the components that collaborate in order to provide the required management and deployment support to allow arrangements of different types of related network functions/elements that form and describe a composite network function 100 in accordance to one embodiment. Network functions ("NF"s) or network elements can include any types of network elements, including session border controllers ("SBC"s), load balancers, etc. Such an arrangement, as a single managed function, is referred to as a "composite network function" ("CNF"). This arrangement can include a combination of disparate network functions that provide specific layers of functionality which, when combined as a whole, provides a more complete offering while hiding the levels of complexity. In addition, each layer can be interconnected to another layer and to one or more network functions as desired to realize a portion of a specific network service. With this type of network function composition, orchestration and management functions that are within the immediate proximity of network functions, due to decentralized control, can provide quick attention to independent network function expansion/contraction, with greater degree of fault localization and isolation, and other benefits described above, to enable operational environments to become much more agile than with known network management approaches which deal with each NF in a discrete fashion.

CNF 100 in accordance with one embodiment allows the construction of pre-existing network functions into finer domain specific functions. For example, an appliance such as an SBC can represent defined sub-components of the CNF that handle signaling and media. These sub-components can be treated as unique entities in the CNF which allows for more granular definition of control policies.

CNF 100 allows existing network functions to be incorporated into a single solution hiding the complexity of the dependencies and interactions from the user. For example, a Core Session Manager ("CSM") and a Subscriber Load Balancer and Route Manager ("SLRM"), both of which are network elements from Oracle Corp., can be combined into a Core IP Multimedia Subsystem ("IMS") solution CNF which hides the maintenance of each element, allowing the service provider to see the solution as one network function with fewer external connections and criteria.

CNF 100 provides the ability to combine disparate network functions ("NF"s) from different vendors. The construct has no dependency on vendor or NF domain knowledge but is open ended to allow any NF to co-exist within the same CNF.

CNF 100 has no dependency on the platforms upon which the NFs are deployed. For example, a CNF can be composed of appliances (i.e., an NF that is deployed on dedicated hardware) or an NF that runs on virtualized machines ("VM"). In this embodiment the CNF is considered a "hybrid" solution as it caters to both physical NFs and virtual NFs coexisting as part of the same solution.

In one embodiment, CNF 100 is an internal construct of the "Oracle Communication Application Orchestrator" ("OCAO") from Oracle Corp., which provides the support to instantiate complex Virtual Network Functions ("VNF"), Physical Network Functions ("PNF"), or a hybrid solution consisting of both VNF and PNF. CNF 100 is an architecture used to address the topological requirements to support VNF as defined by the Network Function Virtualization ("NFV"), which is a network architecture concept, that proposes using information technology virtualization related technologies to virtualize entire classes of network node functions into building blocks. The building blocks may be connected, or chained together to create communication services, in addition to providing the same support for legacy appliances, such as PNFs, and allowing both the virtual and physical elements to co-exist seamlessly within the same CNF. An NFV is disclosed in further detail in the NFV standards promulgated by the European Telecommunications Standards Institute ("ETSI"), the disclosure of which is hereby incorporated by reference.

In one embodiment, CNF 100 is constructed using groups of sameness, which are referred to as "Network Function Groups", or "NF Groups", such as NF Group 102 of FIG. 1. These groups allow sub-components that display similar functionality to be maintained within a self-governed group. This allows CNF 100 to be deployed in a number of individual communities on functionality that know when to scale, how to scale, and how to self-heal, independent of other groups. These self-governed groups are self-sustaining and react to the external changes imposed on them. Therefore, cross functional dependencies that legacy systems need to maintain in order to inform disparate processes how to react to change are minimized. For example in an IMS core, the scaling up (i.e., providing a VM with more resources) of an SLRM instance in an SRLM group means that the system will provide more signaling throughput. The CSM group will see this additional throughput in the key performance indicators ("KPI"s) as it scales and grows its capacity needs to compensate accordingly, which minimizes the cross NF communication previously required. Therefore, using the KPIs and other data, the CNF is able to probe into the internal network elements to isolate faults and quickly present this information.

A network element ("NE") or physical network function ("PNF"), such as PNF 101, is the hardware-based appliance on which a process or set of processes is executed to offer service or plurality of services to the customer. In contrast, a network function ("NF") is the software-based appliance that can run on a range of industry standard server hardware, and that can be moved or instantiated, in various locations in the network as required without the need for installation of new equipment. The need to define an NF as opposed to an NE is to unambiguously indicate that an NF is a software-based solution, and therefore can be considered as a decomposition of its NE predecessor. However, in terms of providing the functionality required to deploy a network, the NE and NF are equivalent.

A Virtualized Network Function ("VNF"), also referred to as a Virtualization Deployment Unit such as VDU 103, is a virtualization of network functions. The VNF can contain one VM instance where the NF software is running, or can be composed of multiple internal components where the VMs within the VNF container can have NF software running or other software running to complete the VNF offering. The CNF is required in order to support network functions that may exist on both physical and virtual infrastructures (i.e., supporting a hybrid solution).

A Virtual Machine ("VM") is the software implementation of a machine (e.g., a computer) that executes programs like a physical machine that runs on a hypervisor.

A Deployment Unit ("DU") is a construct that models the topology of the sub-components that are required to define a single unit instance dependent on the topology policies required. For example, a single instance DU for a high availability ("HA") pair, active and standby, would consist of two VMs in the case of an NF running on virtualized infrastructures, or two PNFs in the case of an NF running on appliances.

A Virtualization Deployment Unit ("VDU"), such as VDU 103, is a construct that models virtual characteristics of a DU. For example a single instance DU for a HA pair would consist of two VMs. A Physical Deployment Unit ("PDU"), such as PDU 107, is similar to a VDU except that the PDU maintains a one-to-many relationship with physical appliances rather than VM instances. A PDU for a HA pair would consist of two PNFs.

An NF Group, such as NF Group 102, in the design of an application orchestrator ("AO") solution, provides for the containment of sameness that is a prerequisite in providing a group of NFs that subscribe to same policies, rules and images. The NF group maintains a one-to-many relationship with its parent CNF. The NF group enables the scaling and management for either a set of PNFs or VNFs in one embodiment.

The NF group maintains several characteristics in order to provide the required service. These characteristics are as follows:

Abstract VIM containers—to support Virtualization Infrastructure Management ("VIM") systems for virtualization, different vendors provide different features on their VIM components. The NF group abstracts how VMs are managed for each VIM, which provides the end user the ability to mix-and match VIM appropriate to their individual problem domain.

Data Center—for virtualization, the NF group can be associated with one-or-many data centers and the DU that the data center is assigned to. For example, if the policy for deploying a new DU instance requires three VM instances, one for active, one for standby and one for geographic redundancy, then it is possible that three VM instances all target different data centers.

Network association—an NF Group is linked to the required unique network instance.

Enforces "sameness"—the NF group maintains VNF/PNFs instantiated for the same functionality. This does not necessarily mean each DU has exactly the same characteristics.

Self-Governed—an NF Group maintains a group of DUs that subscribe to the group's rules and policies. While a foreign agent can make requests changing these rules, the NF group makes the final decision in a deterministic way. This includes changes to rules and policies, and reconciliation of requests to scale out/in or up/down.

Self-healing—an NF Group maintains a set of policies on how to react to failure conditions of its DU members and eco-system (e.g., a VM instance fails to come up, the next VM resource is brought up, etc.). Probing capabilities based on, for example, KPIs, enables the individual elements within a CNF to be isolated.

Policies—the NF group maintains a set of policies that constitute the characteristics of the container in terms of capacity planning, association with other containers, life cycle requirements, and default vertical scaling parameters (e.g., the size of the processor, memory, disk storage, etc.).

Capacity Monitoring—the NF Group has its own dedicated capacity monitor that based on rules determines when a DU instance is spun out/in for horizontal scaling or up/down for vertical scaling.

Bootstrapping—for virtualization, the NF Group has its own boot loader that understands the needs of the VNF VMs to automatically come up and be attached to networks.

Dependencies—the NF Group subscribes to a set of policies on associations between DU members, other NF Groups, and if required other CNFs. While dependencies should be handled (best effort) by the NF software, there may be occasions where the NF group needs to step in and help. For example, rolling out a Session Load Balancer ("SLB") could require an additional NF group of an Access Session Border Controller ("A-SBC") to be deployed at the same time.

A Virtualization Infrastructure Manager ("VIM") manages or orchestrates the virtualization infrastructure. Examples of VIMs include "vCloud Director" from VMware, "Enterprise Manager" from Oracle Corp., "Heat" from OpenStack, etc.

A Composite Network Function Descriptor ("CNFD") describes the deployment, operational behavior and policies that are needed by the CNF. The description if not part of the actual CNF in one embodiment, is an external configuration template that is associated with the CNF. A CNF cannot be fully deployed without an accompanying CNFD in one embodiment. Since this descriptor file can contain information on the VNF, PNF, or both, the internal terminology of CNFD services both purposes seamlessly. There is only one CNFD associated with a CNF in one embodiment.

Data Centers, in the case of virtualization, is a logical representation of a construct that defines storage locations provided to a VIM. Each Data Center has a one-to-one relationship with its parent VIM. The VIM provides the data centers upon which the VNF can be configured to topologies that span various data centers.

The CNF graph descriptor Composite Network Function Graph Descriptor "CNFGD" 114 provides the meta-data needed in order to allow the CNF function to be used in a network service graph. This graph provides an end-to-end solution where VNF and PNF can be linked together for a rollout of a service and the external dependencies for the entire CNF are provided. In order for the CNF to be consumed by a designer or network service its characteristics need to be defined. Because the package being delivered could represent a combination of PNF, VNF, or both, the internal representation is CNFGD. For each CNF package, only one CNFGD exists in one embodiment.

For virtualization support, an open virtual appliance or application "OVA" 115 represents the Open Virtualization Format "OVF" image that is used by the VIM to instantiate a VM with the NF software running. A CNF could contain many OVA images depending on how many layers of NF types it supports.

Figure 2:
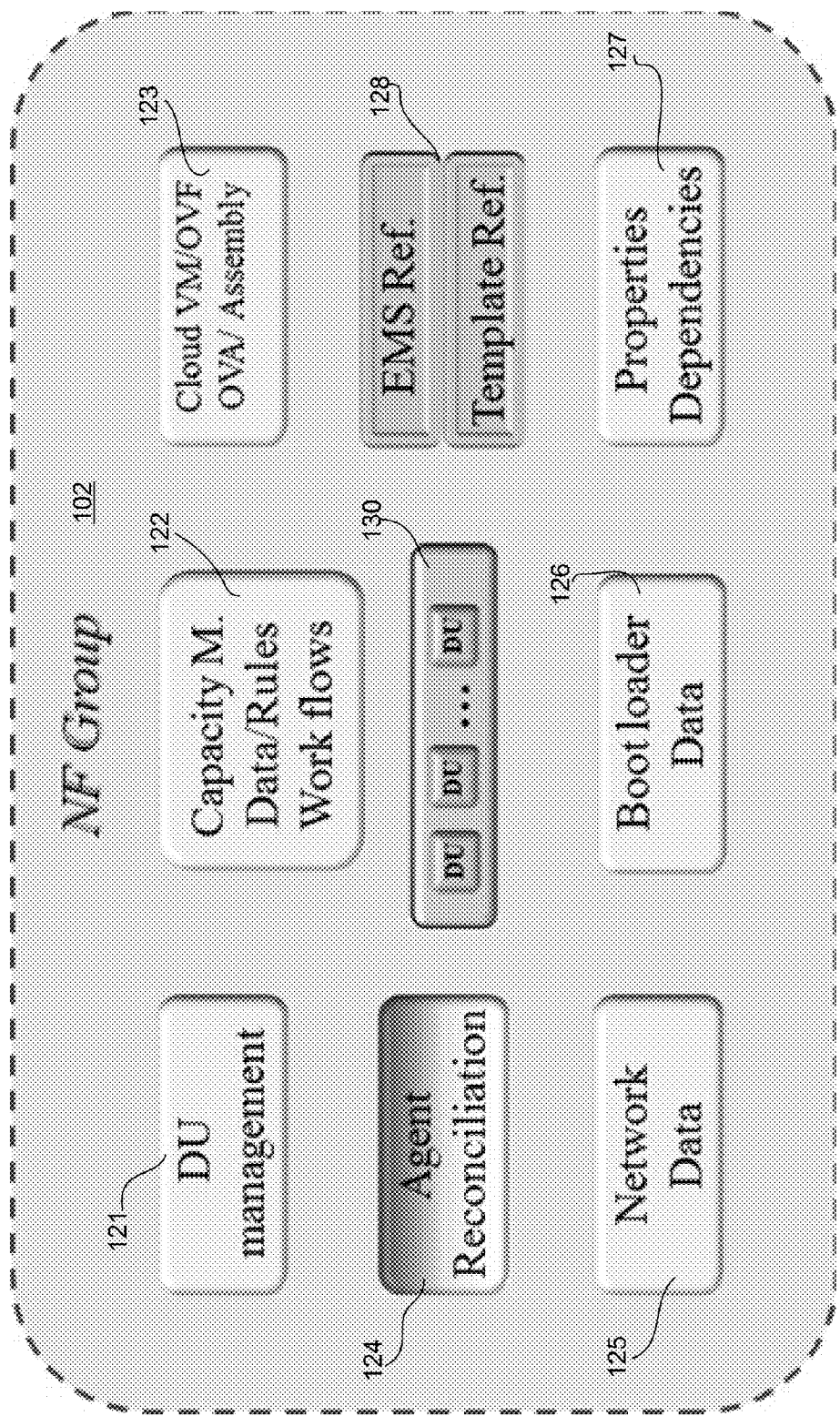
FIG. 2 is a block diagram of components that form the NF Group of FIG. 1 or any NF group in accordance with one embodiment.

FIG. 2 is a block diagram of components that form NF Group 102 of FIG. 1 or any NF group in accordance with one embodiment. An NF group does not need to include all of the elements shown in FIG. 2. NF Group 102 includes a Cloud VM/OVF/OVA Assembly 123 which houses the required properties for the VM's existences in the VIM. In addition, Assembly 123 stores the required OVA or Assembly images that are used by the VIM to instantiate the VM. A DU management 121 provides the management of DU instances and policies required to maintain those instances across data centers. A Capacity Monitor 122 maintains the KPI data, threshold, rules and data flows needed to support scaling determination to provide for elasticity functionality that can appropriate resources when required and release resources back to a common pool when the capacity needs no longer required them.

NF Group 102 further includes an Agent Reconciliation 124 that ensures that DUs 130 are brought up and down in a deterministic way and is also required to reconcile any issues in response to external requests to deploy or un-deploy DUs that do not interfere with the internal Capacity Monitor's 122 state. Agent Reconciliation 124 provides the first level of a self-governing NF group. A Network Data 125 provides the networks to which the VMs in the NF Group are linked to. A Boot Loader Data 126 maintains the additional data content needed to be delivered to the VM instance for it to automatically start and run.

NF Group 102 further includes Properties Dependencies 127 which maintains the policies and dependencies that establish and maintain the VNF/PNF eco-system. NF Group 102 subscribes to policies on associations between DU members, other NF Groups and, if required, other CNFs. An EMS/Template Reference 128 has a reference to an Element Manager ("EM") and Configuration Templates used when activating the DU. The process of activation includes provisioning the customer driven specific configurations to the NF once the CNF topology is created. This maintains the boundaries of responsibilities between the Application orchestration and the Element Management systems.

Figure 3:
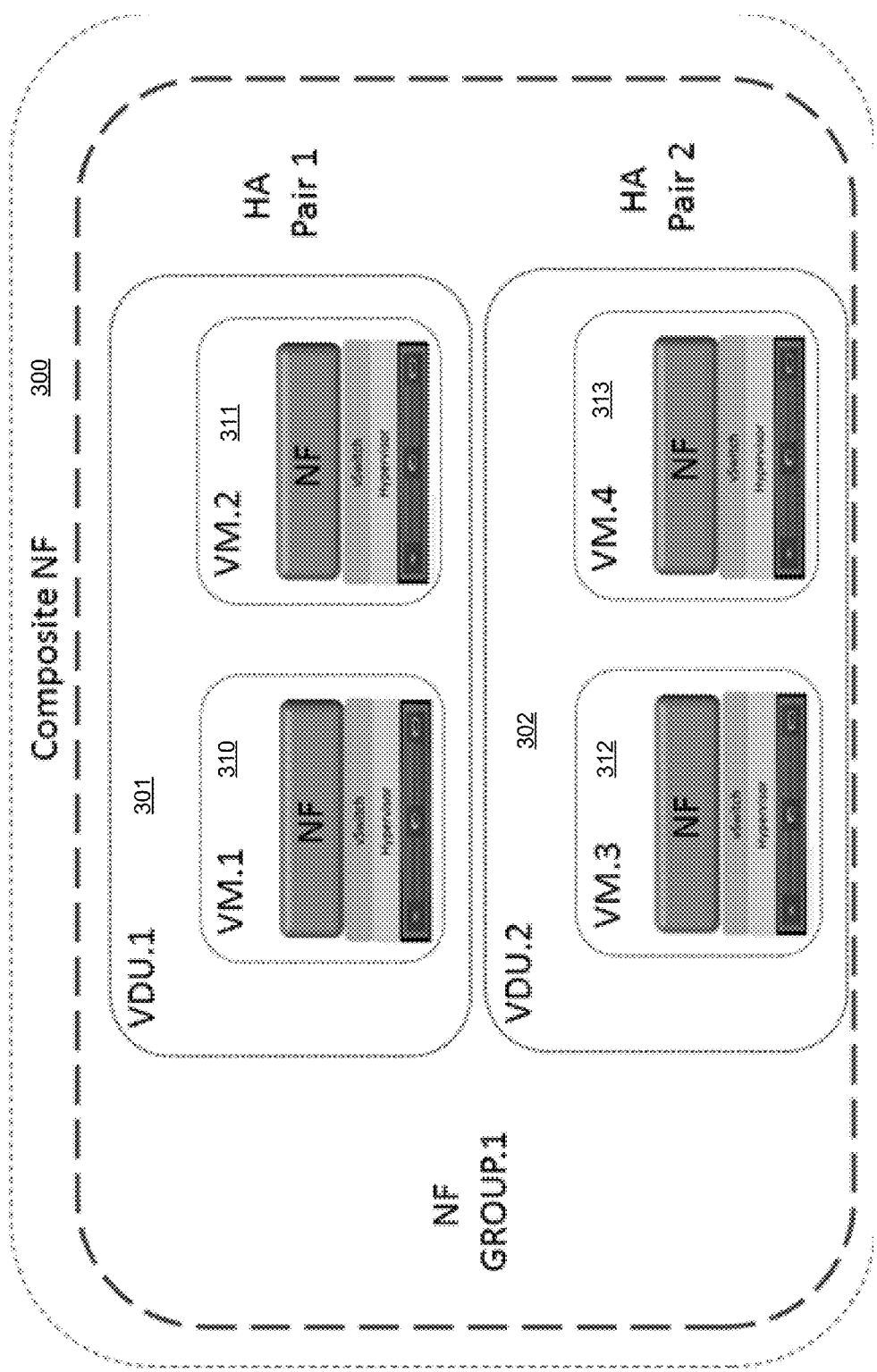
FIG. 3 is a block diagram that illustrates the basic building blocks of a CNF in accordance to embodiments of the present invention.

FIG. 3 is a block diagram that illustrates the basic building blocks of a CNF 300 in accordance to embodiments of the present invention. CNF 300 can include one DU instance (in this example it is a VDU composed of an HA pair of VMs) where the NF software is running, or can be composed of multiple internal component DUs where the NF is maintained within several NF groups. These configurations may be described as "single layered" (i.e., one NF Group) or "multi-layered" (i.e., multiple NF groups) CNF topologies, respectively. Whether it is single layered or multi-layered, the common criteria in embodiments of these CNFs is that they are composed of DUs that subscribe to a common NF that needs to maintain its own characteristics.

CNF 300 supports a complex topology by providing a discrete, well defined, set of building blocks that can be re-used to construct a multi sub-component NF. For example, in FIG. 3, CNF 300 is a single level NF, that is composed of a single NF group, which has deployed two virtualized DUs, or "VDU"s 301, 302. Each VDU is composed of two VMs 310-313 required for HA topology.

Figure 4:
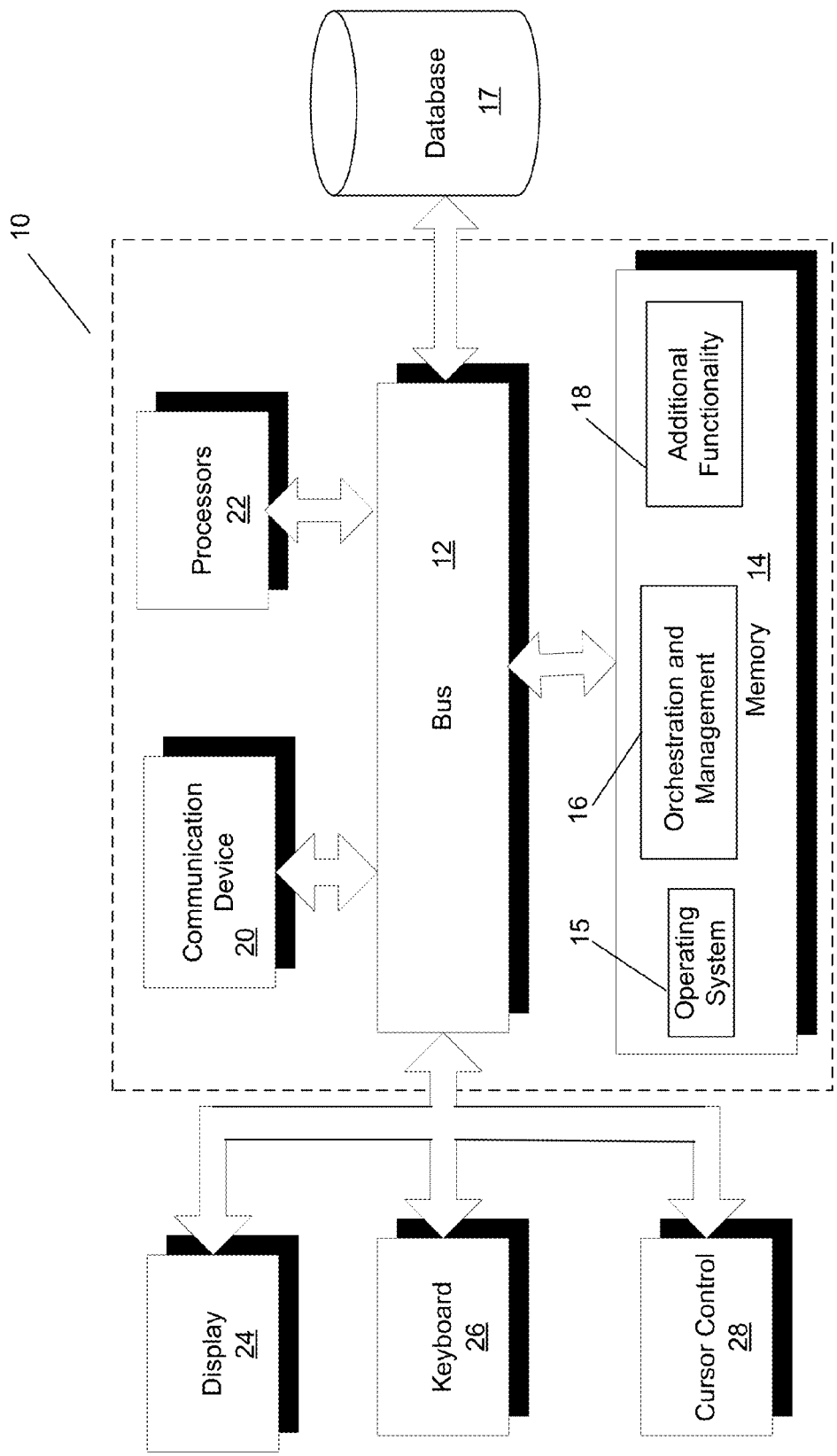
FIG. 4 is a block diagram of a computer server/system in accordance with an embodiment of the present invention.

FIG. 4 is a block diagram of a computer server/system 10 in accordance with an embodiment of the present invention. System 10 can be used to implement any of the network elements shown in FIGS. 1-3 and the following figures as necessary in order to implement any of the functionality of embodiments of the invention disclosed in detail herein. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include an orchestration and management module 16 for performing orchestration and management of a CNF, and all other functionality disclosed herein. System 10 can be part of a larger system, such as added functionality to the "Oracle Communications Application Orchestrator" from Oracle Corp. Therefore, system 10 can include one or more additional functional modules 18 to include the additional functionality. A database 17 is coupled to bus 12 to provide centralized storage for modules 16 and 18.

Figure 5:
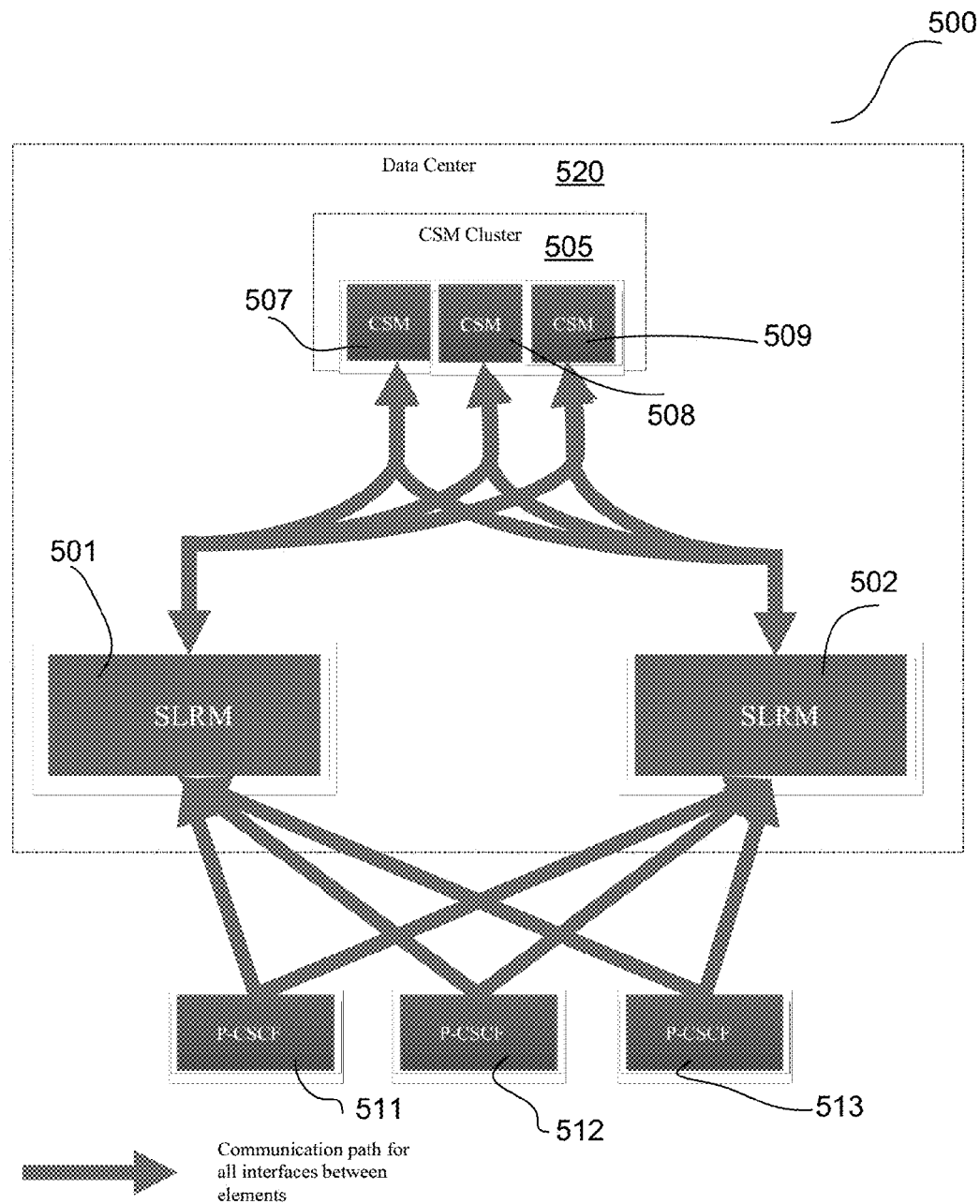
FIG. 5 is a block diagram that illustrates a network topology for an IMS core solution.

Embodiments use the internal CNF models disclosed above in conjunction with FIGS. 1-4 in order to "convert" or "map" network topology into a CNF that can be orchestrated and managed. FIG. 5 is a block diagram that illustrates a network topology for an IMS core solution 500 that includes two Subscriber Load Balancer and Route Managers ("SL-RM"s) 501, 502, a Core Session Manager ("CSM") Cluster 505 that includes multiple CSMs 507-509, and multiple Proxy-Call Session Control Functions ("P-CSCFs") 511-513, as defined by the 3GPP standards. FIG. 5 illustrates an active-active SLRM-CSM deployment on the same data center. In this scenario, a data center 520 is a logical representation of the physical hardware storage location. In the VIM world the physical location of storage would be mapped to a virtual representation of a data center using, for example VMWare, as a virtual data center. In an embodiment using Oracle Enterprise Manager, it is termed a Zone, etc. In FIG. 5, all virtual storage and physical components in this example are co-located in the same data center 520.

Figure 6:
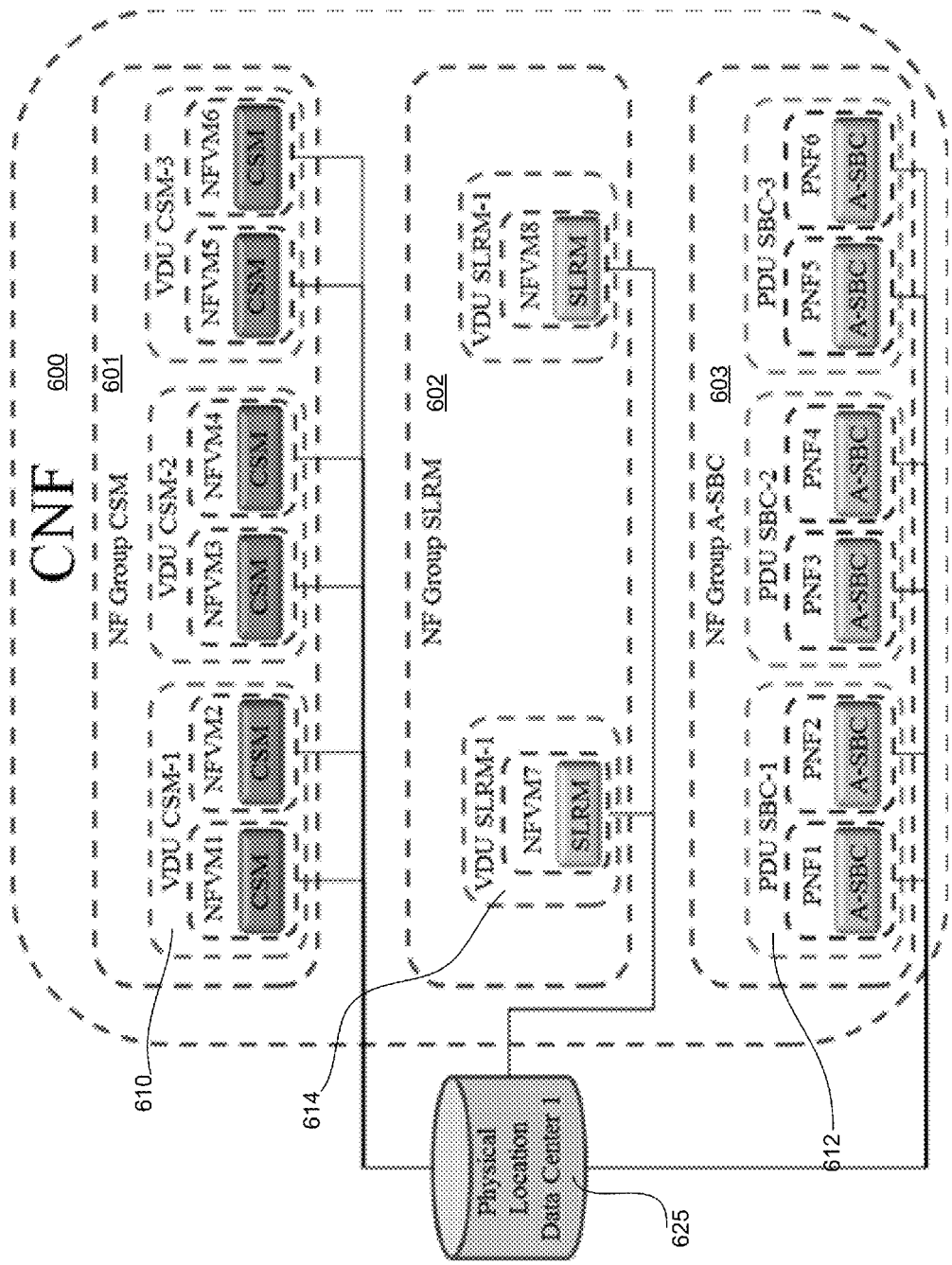
FIG. 6 illustrates a mapping of the topology of FIG. 5 to a CNF in accordance with one embodiment.

FIG. 6 illustrates a mapping of topology 500 of FIG. 5 to a CNF 600 in accordance with one embodiment. In FIG. 6, one possible construction of the CSM-SLRM example of FIG. 5 is to create an NF group 601 for the CSMs, an NF group 602 for the SLRMs and an NF group 603 for A-SBCs (i.e., the Access SBC ("A-SBCs") in this example model the P-CSCF functionality of FIG. 5). NF groups 601 and 602 for the CSMs and SLRMs, respectively, represent groups of VDUs. NF group 603 for A-SBCs represents a group of PDUs. As disclosed, CNF 600 handles PNFs and VNFs in the same manner within a construction, which therefore leads to the necessity of a composite NF such as CNF 600. Further, each CSM VDU instance (e.g., instance 610), and each A-SBC PDU instance (e.g., instance 612), are composed of an HA pair, while each SLRM VDU instance (e.g., instance 614) is standalone. In total, CNF 600 of FIG. 6 would require resources for eight VMs and six PNF appliances. In one embodiment, these VNFs and PNFs are hosted in the same geographic location 625. Further, in one embodiment, all CSM, SLRM and A-SBC instances are in configuration clusters, meaning that the Element Manager ensures three "Golden Master" configuration templates that help synchronize configuration among the CSM, or SLRM or A-SBC. A Golden Master provides a configuration template to ensure VDU and PDU instances can be instantiated with the most current configuration requirements. Similarly, an "offline configuration" is a configuration template that can be applied to VNFs and PNFs that are active, or will be active in the future. It constitutes the bases of a golden master.

Figure 7:
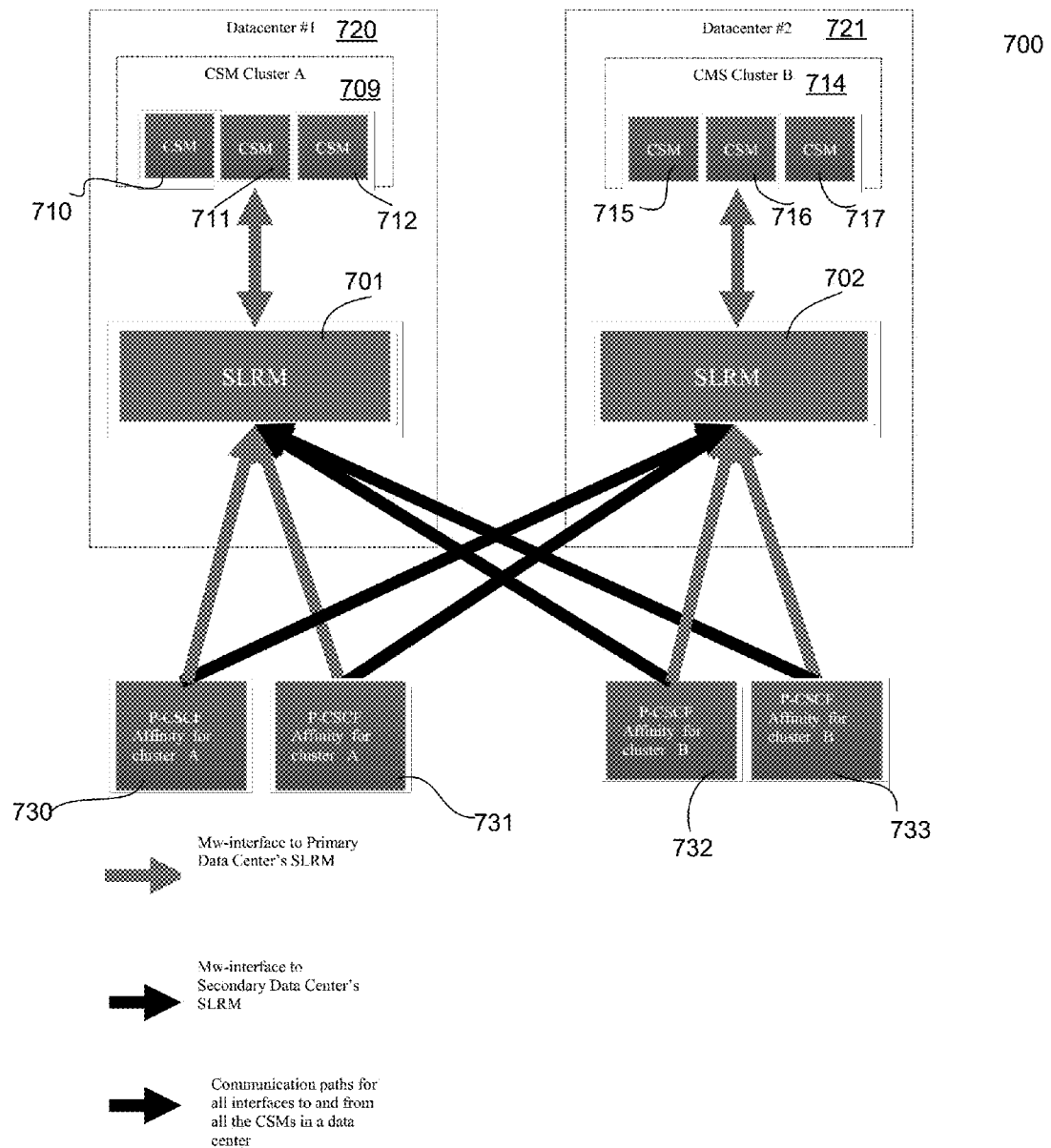
FIG. 7 is a block diagram that illustrates a network topology that is similar to the topology of FIG. 5 except with two data centers in accordance with one embodiment.

FIG. 7 is a block diagram that illustrates a network topology 700 that is similar to topology 500 except with two data centers 720, 721 in accordance with one embodiment. Topology 700 includes P-CSCFs 730-733, with each data center 720, 721 using one as a primary and the other as a secondary. Each data center 720, 721 includes an SLRM 701, 702 which manages a cluster 709, 714 of CSMs 710-712 and 715-717. A P-CSCF among P-CSCFs 730-733 will attempt to contact its primary data center via its respective SLRM 701, 702. If the contact fails, the P-CSCF will attempt to contact its secondary data center. In this scenario, each data center 720, 721 represents the physical hardware storage location, where data center 1 (720) and data center 2 (721) are in different geographic locations. It is also assumed that P-CSCFs 730-733 are each at entirely different geographic locations in one embodiment.

Figure 8:
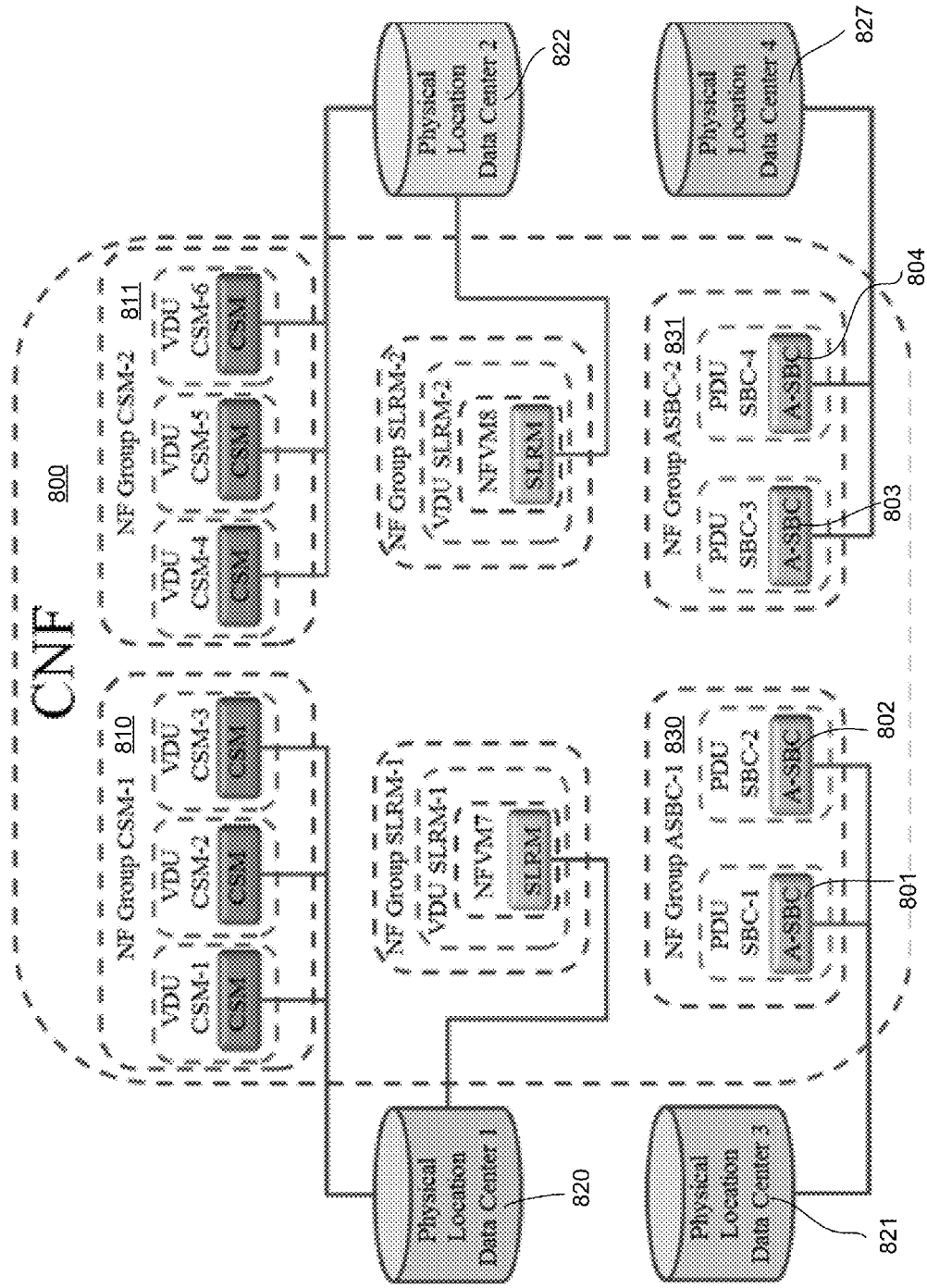
FIG. 8 is a block diagram illustrating the mapping of the topology of FIG. 7 into a CNF deployment model to support the CSM-SLRM geographic redundancy in accordance with one embodiment.

FIG. 8 is a block diagram illustrating the mapping of the topology of FIG. 7 into a CNF deployment model to support the CSM-SLRM geographic redundancy in accordance with one embodiment. In the embodiment of FIG. 8, it is assumed that the A-SBCs 801-804 are at entirely different geographic locations than the VNF data centers. In addition, the datacenter physical storage for the VM instances is also housed at different geographic location which may or may not be co-located with their respective A-SBC appliances.

As shown in FIG. 8, there are separate NF groups 810, 811 for the CSM NF groups, and separate NF groups 812, 813 for the SLRM NF groups. This allows for two separate configuration templates. For example, in FIG. 7, each CSM at each location only communicates to the same SLRM at the same data center. Therefore each CSM VDU instance in NF Group CSM-1 (810) subscribes to the same "Golden Master A" configuration that identifies VDU SLRM-1 at Data Center 820. Similarly each CSM VDU instance in NF Group CSM-2 (811) subscribes to the same "Golden Master B" configuration/template that identifies VDU SLRM-2 at Data Center 822.

Each VDU CSM instance can represent a standalone NFVM (i.e., NF running on a VM) or a HA pair consisting of 2 NFVMs. In FIG. 8, the CSM NFVMs are not shown, however all NFVMs instantiated as part of NF Group CSM-1 store their data in Physical location Data Center 1 (820), while all NFVMs instantiated as part of NF Group CSM-2 store their data in Physical location Data Center 2 (822).

There are two NF groups 830, 831 for the A-SBC as with FIG. 6 so that two separate Golden Master Configurations/Templates can be maintained at 821, 827. Therefore, each A-SBC is able to specify an affinity to a data center by configuring its preferred-cluster. This gives the A-SBC (i.e. the P-CSCF) the ability to know if a user has an affinity for its A-SBC cluster. This can be used for rebalancing endpoints back to their preferred cluster. Therefore, the Golden Master configuration/template maintaining NF Group ASBC-1 is slightly different than the Golden Master configuration/template maintaining NF Group ASBC-2.

While it is important that the CNF map the VNF VM instances to the correct data center reference (which the VIM then maps to the correct physical data center), in other embodiments there is no need for the CNF to know the data center where a PNF is running. However, in order to ensure that a new PNF instance when requested is targeting a PNF at the correct geographic location, this information should also be provided. The geographic location can be used for verification purposes in case of user error in entering the correct PNF credentials.

Figure 9:
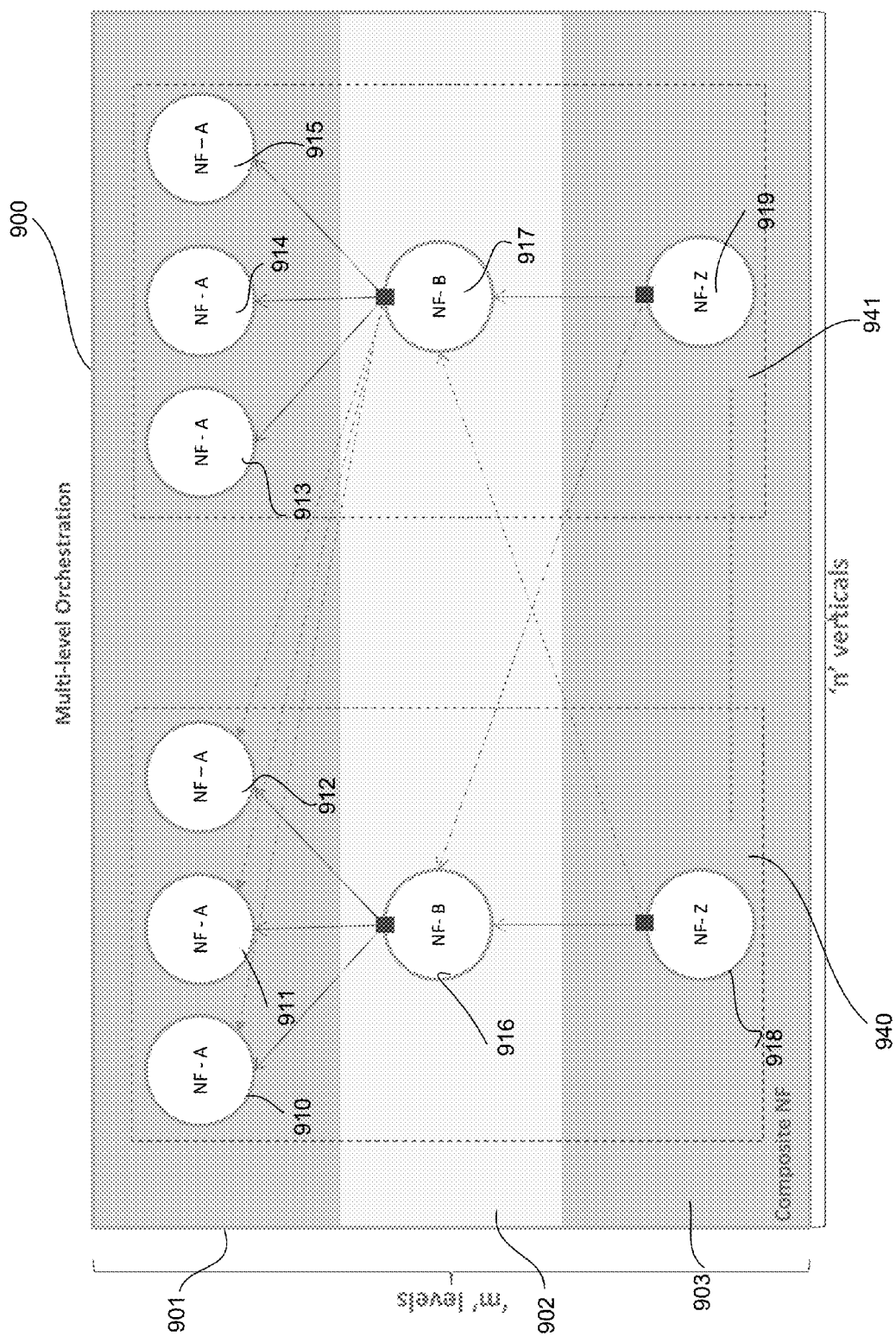
FIG. 9 is a block diagram of a CNF in accordance with embodiments of the present invention.

FIG. 9 is a block diagram of a CNF 900 in accordance with embodiments of the present invention. CNF 900 includes multiple network elements (e.g., an SBC, a load balancer, etc.) 910-919, also referred to as network functions ("NF"). CNF 900 further includes "m" levels, including levels 901-903, where each level is defined as an NF group that maintains a unique NF process. CNF 900 further includes "n" verticals, including verticals 940, 941. Each vertical represents a mapping to distinct data centers which represent sites that can be, for example, at different geographic locations. Unlike known approaches for managing elements 910-919, in which each element would be deployed and orchestrated separately, CNF 900 acts as a container for all elements 910-919, so orchestration and deployment of all of the elements can be centrally managed. In one embodiment, a "Golden Master" template is used to deploy each of elements 910, 919, at a specific layer (NF Group), including setting up the connectivity between levels. Each layer has its own distinct Golden Master template. Elements 910-919 are synchronized in one embodiment using a configuration model of an element manager, such as Oracle Communication Session Element Manager ("OC-SEM").

As described, a CNF in accordance with embodiments can act as a container to provide a "black box" abstraction of a composite network function. The functionality of the underlying network elements can be moved to either a physical or virtual machine, or a hybrid arrangement. Therefore, all of the complexity of orchestrating, deploying and maintaining the individual elements with the CNF can be handled at the single CNF level. Further, the functionality within a single CNF can be deployed in multiple geographically dispersed data centers, thus providing geographic redundancy within a CNF. Further, because of the hybrid physical/virtual functionality, when a new hardware element, such as a new SBC, needs to be added to a network, a virtual version of the element can be temporarily added before the actual physical element is configured and implemented.

For example, an NF Group can be created which uses a Golden Master that was seeded from an existing Golden Master that configures a PDU. This allows a VDU instance to be instantiated quickly, often within three to four minutes, which provides the required additional throughput needed by the network. This allows the network to respond to increased capacity demands while the process to procure, deliver and install appliances for an additional PDU rollout is undertaken, which is a process that could take from six to twelve months to achieve.

Figure 10:
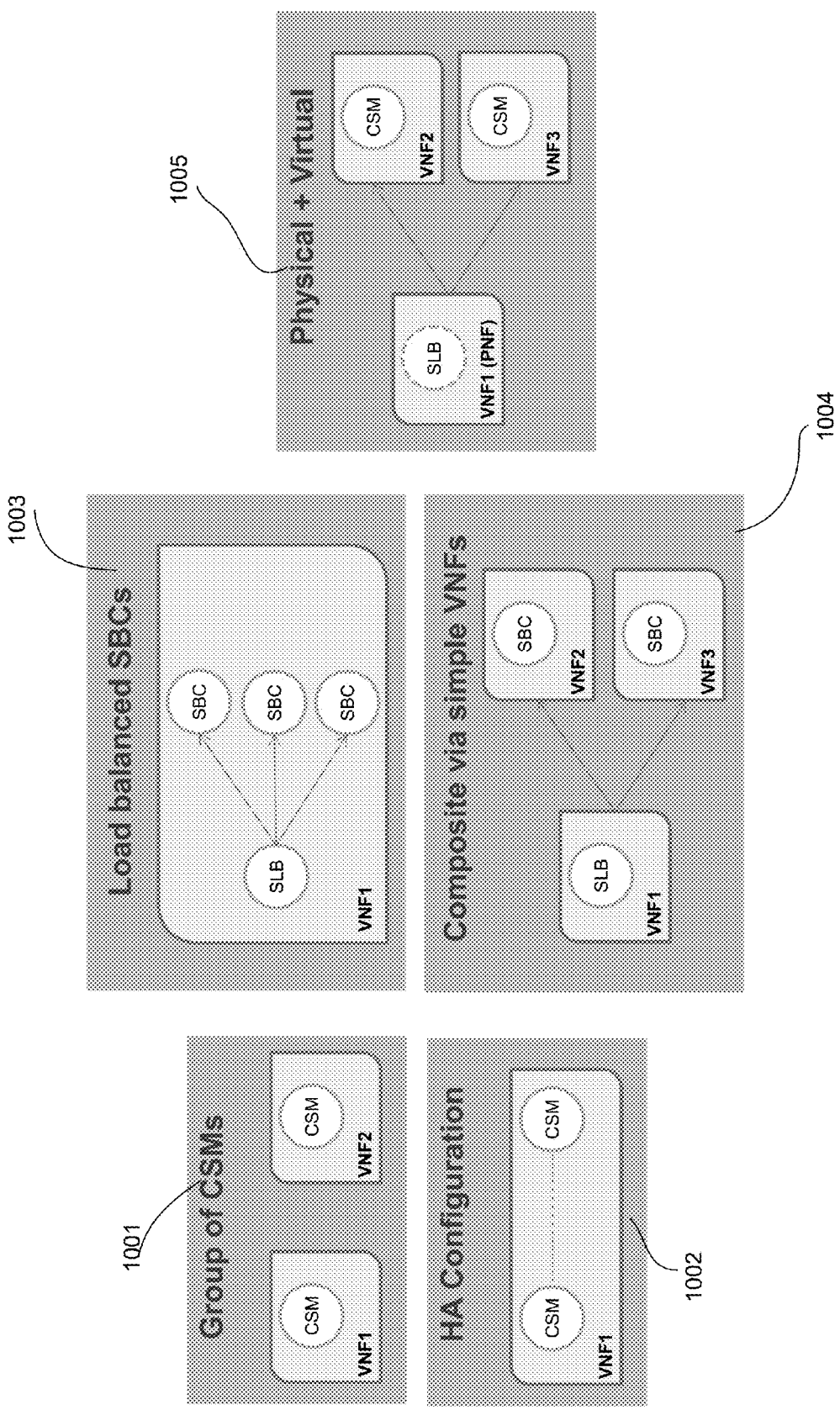
FIG. 10 illustrates some example CNFs in accordance with embodiments of the invention.

FIG. 10 illustrates some example CNFs in accordance with embodiments of the invention. CNF 1001 includes a group of CSMs, the functionality of which is each implemented on a virtual machine (i.e., VNF1 and VNF2). CNF 1002 is a high availability ("HA") configuration in which an active and standby CSM is implemented on a single VNF. CNF 1003 is a load balanced session border controller ("SBC") that includes multiple SBCs coupled to a session load balancer ("SLB"), all implemented as sub-processes in a single CNF. CNF 1004 is also provides the function of a load balanced SBC, with each component implemented as a separate VNF that could run on its own. CNF 1005 illustrates a hybrid configuration where each CSM is implemented on a separate VNF, and an SLB is implemented on a physical machine (i.e., PNF).

Figure 11:
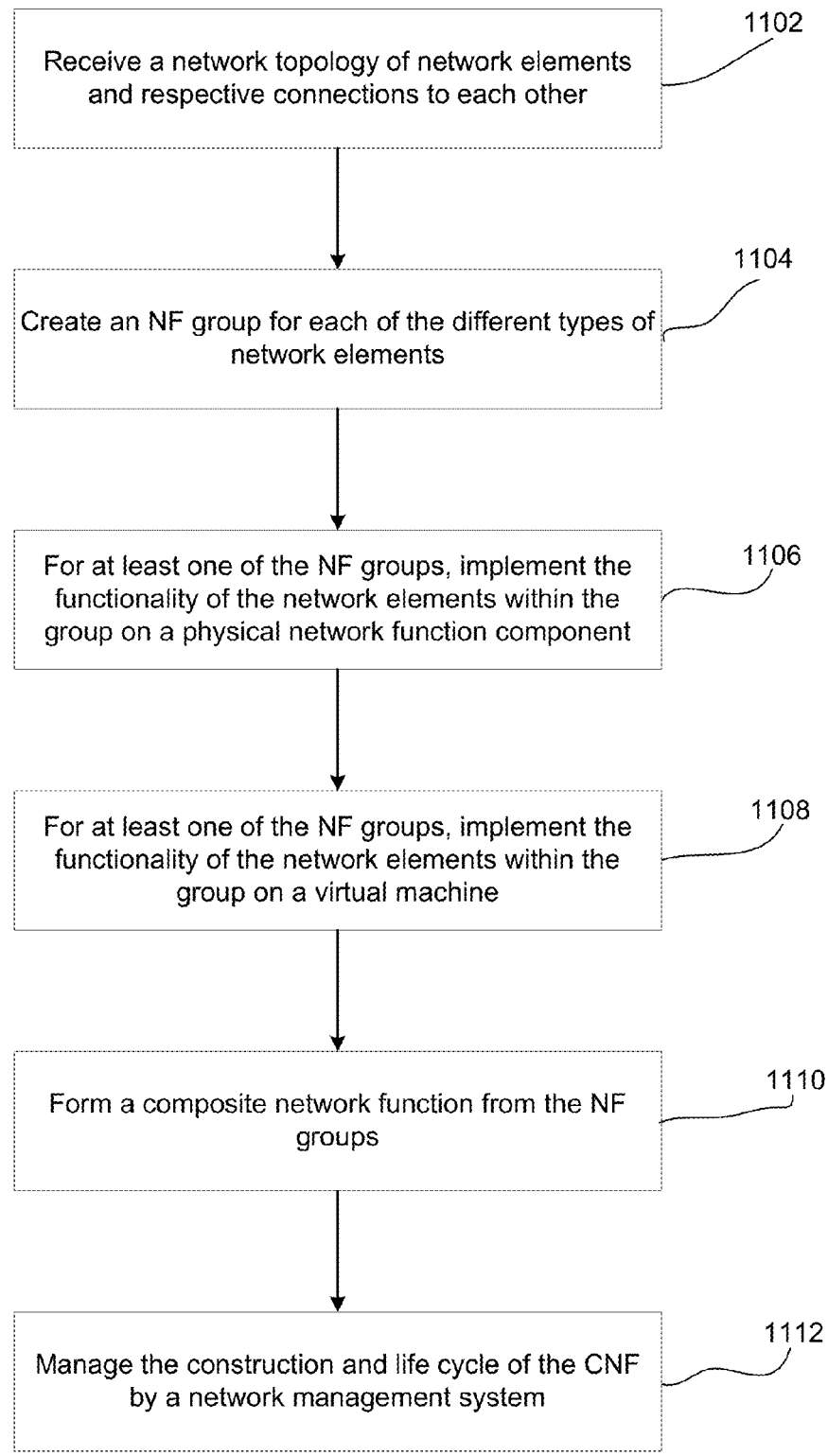
FIG. 11 is a flow diagram of the orchestration and management module of FIG. 4 when generating, orchestrating and managing composite network functions in accordance with embodiments of the present invention.

FIG. 11 is a flow diagram of orchestration and management module 16 of FIG. 4 when generating, orchestrating and managing composite network functions in accordance with embodiments of the present invention. In one embodiment, the functionality of the flow diagram of FIG. 11 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1102, module 16 receives a network topology of network elements and respective connections to each other. The network topology can include multiple levels, and there may be multiple different types of network elements such as SBCs, CSMs, SLRMs, SLBs, etc. The network topology can also include multiple data centers.

At 1104, module 16 creates an NF group for each of the different types of network elements.

At 1106, for at least one of the NF groups, the functionality of the network elements within the group are implemented on a physical network function component.

At 1108, for at least one of the NF groups, the functionality of the network elements within the group are implemented as a virtual machine.

At 1110, a composite network function ("CNF") is formed from the NF groups.

At 1112, the construction and life cycle of the CNF is managed by a management system that enforces the requirements of a CNF as described herein and can manage the lifecycle of a virtual network function. In one embodiment, the system that manages the CNF is the Oracle Communications Application Orchestrator ("OCAO"). The management functionality can also be implemented by orchestration and management module 16 of FIG. 4. The management of the capabilities required of a CNF in accordance with embodiments of the invention includes the following:

Consuming a CNF description which is used to deploy and manage each sub-component that makes up the CNF.

Creating and enforcing all the required characteristics and sub-components that are needed for an NF group to be self-governing and self-healing, and enforcing the ability for a DU to subscribe to the sameness criteria previously discussed.

Managing NF groups independently so that each group can have unique scaling and capacity requirements, but also allow for the NF groups to have dependencies on NF groups if required.

Managing the life cycles of the DU instances under each NF group by orchestrating processes that involve the close collaboration of an Element Manager (e.g., the OCSEM), a VIM (e.g., OpenStack), and a Network Function Service Orchestrator ("NFSO") for external dependencies on other NFs. In this way, the network manager can instantiate DU instances and their related VMs and ensure that they are properly configured and functional in most cases without user intervention.

Monitoring all the VMs and PNFs involved in the CNF and on each NF Group and providing an appropriate capacity determination on when the network requires the CNF to scale to meet demand.

Providing the ability to manually scale DU instances, which allows the end user to control the process, and also providing an auto-scaling mode which is primarily used to provide elasticity scaling to allow resources to be used only when required.

Figure 12:
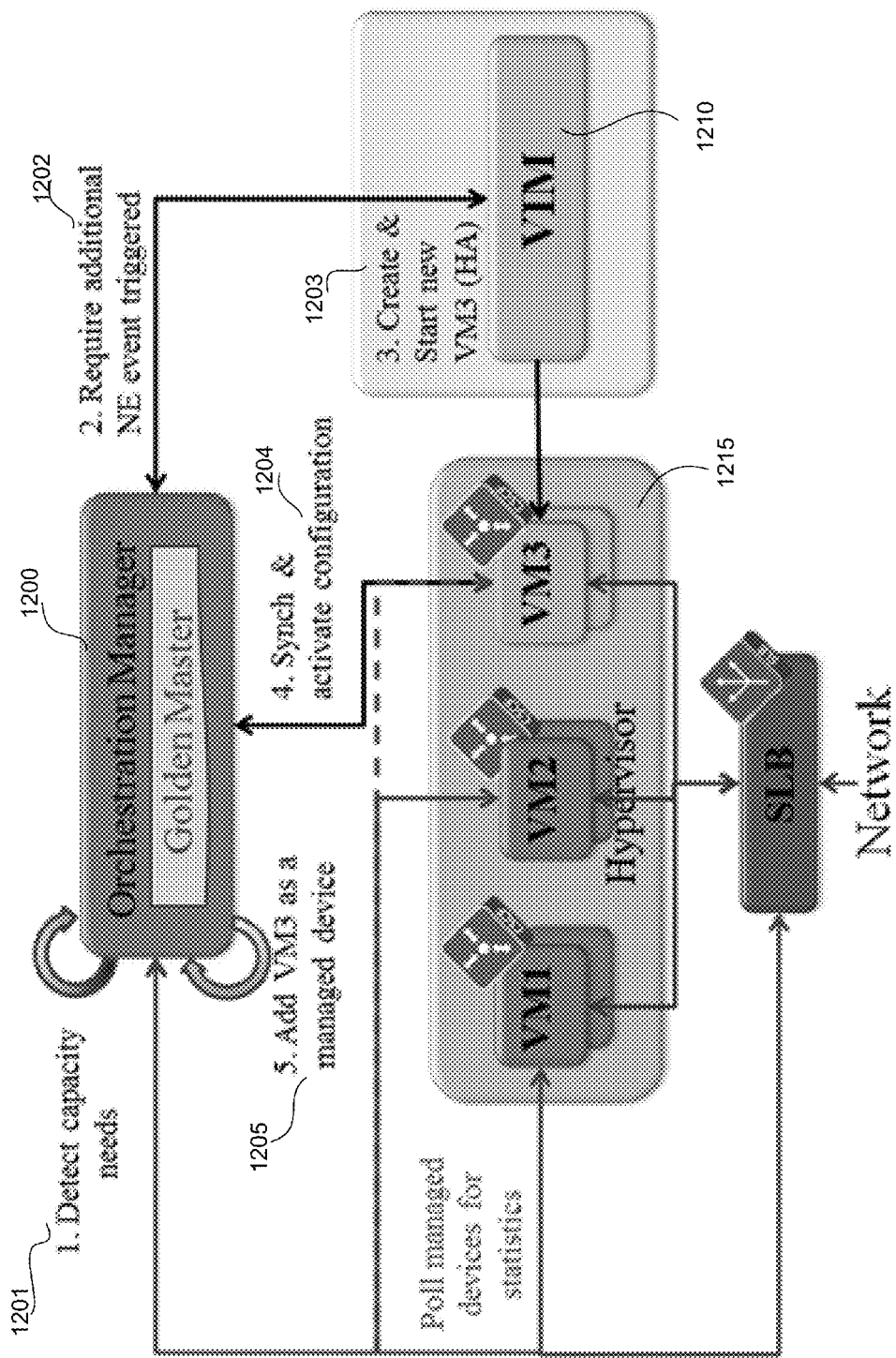
FIG. 12 illustrates the functionality performed by an orchestration manager when scaling out a new DU instance in accordance with embodiments of the invention.

FIG. 12 illustrates the functionality performed by an orchestration manager 1200 when scaling out a new DU instance in accordance with embodiments of the invention. In the example of FIG. 12, a new VDU instance is instantiated in response to being triggered by a need to scale a determination event.

At 1201, by analyzing the KPI metric statistics for each VM in the targeted NF group, an NF Group capacity planner of orchestration manager 1200 determines that there is a need to scale out a new VDU instance consisting of two VM's to support an HA pair.

At 1202, orchestration manager 1200 sends the appropriate OVA image and bootloader parameters to the targeted VIM 1210 requesting the VM be started correctly.

At 1203, VIM 1210 creates the new VM (i.e., VM3) instance on the targeted hypervisor 1215 and passes the bootloader parameters to the guest running on the VM to establish identity and connect to the networks. VIM 1210 informs orchestration manager 1200 that the requested VM requested (VM3) is up and running.

At 1204, orchestration manager 1200 delegates to the Element Manager (such as OCSEM) the request to push and configure the NF on the targeted VM3 to allow the NF to run and process similar traffic as its neighbors VM1 and VM2 are already doing.

At 1205, the OCSEM and orchestration manager 1200 adds this new VM3 as a managed device and starts polling for the PKI statistics of the VM3 which then are added to the existing KPI stats that the capacity planner is analyzing.

As disclosed, embodiments form a CNF from multiple network elements. Some of the network elements can be implemented on physical components, and some can implemented as virtual components. Each different type of network element is represented by an NF group. The CNF can be managed centrally to instantiate and configure new network elements, expand and contract network elements based on capacity needs, and otherwise manage the overall lifecycle of network functions.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of managing a network comprising a plurality of network elements, the method comprising:
   receiving a network topology of the network elements, the network elements comprising a first type of network elements and a second type of network elements;
   creating a first network function (NF) group corresponding to the first type of network elements;
   creating a second NF group corresponding to the second type of network elements;
   implementing a functionality of the first NF group on a physical network function component;
   implementing a functionality of the second NF group as a virtual machine (VM); and
   forming a composite network function (CNF) comprising the first NF group and the second NF group.

2. The method of claim 1, further comprising centrally managing the CNF.

3. The method of claim 2, wherein the managing comprises receiving key performance indicators (KPIs) from each VM.

4. The method of claim 3, wherein the managing further comprises adding an additional VM to the CNF in response to the KPIs.

5. The method of claim 1, wherein each instance of the second type of network elements comprises a high availability pair.

6. The method of claim 1, wherein the CNF comprises a plurality of verticals, wherein each vertical is mapped to a distinct data center.

7. The method of claim 6, wherein a first data center is at a first geographic location, and a second data center is at a second geographic location that is geographically different than the first geographic location.

8. The method of claim 1, wherein the CNF comprises a plurality of layers, wherein each layer comprises a plurality of network elements, and a distinct template deploys the network elements of each layer.

9. A non-transitory computer-readable medium having instructions stored thereon that, when executed by a processor, cause the processor to manage a network comprising a plurality of network elements, the managing comprising:
    receiving a network topology of the network elements, the network elements comprising a first type of network elements and a second type of network elements;
    creating a first network function (NF) group corresponding to the first type of network elements;
    creating a second NF group corresponding to the second type of network elements;
    implementing a functionality of the first NF group on a physical network function component;
    implementing a functionality of the second NF group as a virtual machine (VM); and
    forming a composite network function (CNF) comprising the first NF group and the second NF group.

10. The computer-readable medium of claim 9, the managing further comprising centrally managing the CNF.

11. The computer-readable medium of claim 10, wherein the managing comprises receiving key performance indicators (KPIs) from each VM.

12. The computer-readable medium of claim 11, wherein the managing further comprises adding an additional VM to the CNF in response to the KPIs.

13. The computer-readable medium of claim 9, wherein each instance of the second type of network elements comprises a high availability pair.

14. The computer-readable medium of claim 9, wherein the CNF comprises a plurality of verticals, wherein each vertical is mapped to a distinct data center.

15. The computer-readable medium of claim 14, wherein a first data center is at a first geographic location, and a second data center is at a second geographic location that is geographically different than the first geographic location.

16. The computer-readable medium of claim 9, wherein the CNF comprises a plurality of layers, wherein each layer comprises a plurality of network elements, and a distinct template deploys the network elements of each layer.

17. A network management system for managing a plurality of network elements, the system comprising:
    a processor executing instructions to:
        receive a network topology of the network elements, the network elements comprising a first type of network elements and a second type of network elements;
        create a first network function (NF) group corresponding to the first type of network elements;
        create a second NF group corresponding to the second type of network elements;
        implement a functionality of the first NF group on a physical network function component;
        implement a functionality of the second NF group as a virtual machine (VM); and
        form a composite network function (CNF) comprising the first NF group and the second NF group.

18. The system of claim 17, wherein the CNF comprises a plurality of verticals, wherein each vertical is mapped to a distinct data center.

19. The system of claim 18, wherein a first data center is at a first geographic location, and a second data center is at a second geographic location that is geographically different than the first geographic location.

20. The system of claim 17, wherein the CNF comprises a plurality of layers, wherein each layer comprises a plurality of network elements, and a distinct template deploys the network elements of each layer.

* * * * *

UNITED STATES PATENT AND TRADEMARK OFFICE
CERTIFICATE OF CORRECTION

PATENT NO.       : 9,584,377 B2
APPLICATION NO.  : 14/550271
DATED            : February 28, 2017
INVENTOR(S)      : Prasad et al.

It is certified that error appears in the above-identified patent and that said Letters Patent is hereby corrected as shown below:

Column 4, Line 19, delete "SRLM" and insert -- SLRM --, therefor.

Column 9, Lines 26-27, delete "datacenter" and insert -- data center --, therefor.

Signed and Sealed this
Twenty-second Day of August, 2017

Joseph Matal
*Performing the Functions and Duties of the
Under Secretary of Commerce for Intellectual Property and
Director of the United States Patent and Trademark Office*